United States Patent
Moretti et al.

(10) Patent No.: US 7,260,112 B2
(45) Date of Patent: Aug. 21, 2007

(54) METHOD AND APPARATUS FOR TERMINATING AND BRIDGING NETWORK PROTOCOLS

(75) Inventors: Michael Moretti, Saratoga, CA (US); David Geddes, Fremont, CA (US); Thomas Wu, Pleasanton, CA (US); Salil Suri, Fremont, CA (US); Scott Furey, Cupertino, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 889 days.

(21) Appl. No.: 10/659,538

(22) Filed: Sep. 9, 2003

(65) Prior Publication Data

US 2004/0120313 A1    Jun. 24, 2004

Related U.S. Application Data

(60) Provisional application No. 60/436,218, filed on Dec. 24, 2002.

(51) Int. Cl.
*H04J 3/16* (2006.01)
*H04J 3/22* (2006.01)

(52) U.S. Cl. .................... 370/467; 370/401; 370/402; 370/405; 370/408; 370/465; 370/466; 370/469; 370/471; 709/245; 709/249; 709/230

(58) Field of Classification Search .................. None
See application file for complete search history.

(56) References Cited

U.S. PATENT DOCUMENTS

| | | | | |
|---|---|---|---|---|
| 5,638,431 | A | * | 6/1997 | Everett et al. ......... 379/114.28 |
| 6,028,984 | A | * | 2/2000 | Kimball ................... 370/401 |
| 6,067,595 | A | * | 5/2000 | Lindenstruth ............ 710/307 |
| 6,196,846 | B1 | * | 3/2001 | Berger et al. ............. 434/118 |
| 2002/0124108 | A1 | * | 9/2002 | Terrell et al. ............. 709/245 |

* cited by examiner

*Primary Examiner*—Raj K Jain
(74) *Attorney, Agent, or Firm*—Law Office of Gerald Maliszewski; Gerald Maliszewski (57) ABSTRACT

Methods and apparatus for bridging network protocols are disclosed. A protocol bridge may be used to function as a target for a network processor while performing a target mode operation, while functioning as an initiator on behalf of the network processor while performing an initiator mode operation. In one embodiment, the protocol bridge determines the mode of operation based on information in a received frame's header. In another embodiment, the protocol bridge couples a Fiber Channel device to a storage processor on a packet-over-SONET network.

32 Claims, 6 Drawing Sheets

FIG. 1

| FIG. 1A |
| FIG. 1B |

METHOD AND APPARATUS FOR TERMINATING AND BRIDGING NETWORK PROTOCOLS

CROSS REFERENCE TO RELATED APPLICATIONS

This application is related to and claims priority from provisional application Ser. No. 60/436,218, entitled "Method and Apparatus for Terminating and Bridging Network Protocols," filed on Dec. 24, 2002.

BACKGROUND OF THE INVENTION

1. Field of the Invention

The present invention relates in general to data networks and more particularly, to a method and apparatus for terminating a Fibre Channel protocol and bridging to an SCSI protocol over POS.

2. Background of the Invention

Fibre Channel is a computer communications protocol designed to provide for higher performance information transfers. Fibre Channel allows various existing networking protocols to run over the same physical interface and media. In general, Fibre Channel attempts to combine the benefits of both channel and network technologies.

A channel is a closed, direct, structured, and predictable mechanism for transmitting data between relatively few entities. Channels are commonly used to connect peripheral devices such as a disk drive, printer, tape drive, etc. to a workstation. Common channel protocols are Small Computer System Interface (SCSI) and High Performance Parallel Interface (HIPPI).

Networks, however, are unstructured and unpredictable. Networks are able to automatically adjust to changing environments and can support a larger number of connected nodes. These factors require that much more decision making take place in order to successfully route data from one point to another. Much of this decision making is done in software, making networks inherently slower than channels.

Fibre Channel has made a dramatic impact in the storage arena by using SCSI as an upper layer protocol. Compared with traditional SCSI, the benefits of mapping the SCSI command set onto Fibre Channel include faster speed, connection of more devices together and larger distance allowed between devices. In addition to using SCSI, several companies are selling Fibre Channel devices that run Internet Protocol (IP).

As Fibre Channel continues to expand into the storage markets, there will be an increasing need for being able to access mass storage devices quicker and from greater distances using such applications as multimedia, medical imaging, and scientific visualization. As such, there is a need for an improved system for processing information in the Fibre Channel arena.

BRIEF SUMMARY OF THE INVENTION

Methods and apparatus for bridging protocols are disclosed. In one embodiment, an apparatus comprises a first network interface coupled to a network device on a first network in accordance with a first protocol, a second network interface coupled to a network processor on a second network having a second protocol, and a processor coupled to the first network interface and the second network interface, said processor to translate said first protocol to said second protocol. In this embodiment, the apparatus receives network transfers on behalf of the network processor while operating in a first mode, and initiates network transfers on behalf of the network processor while operating in a second mode.

Other embodiments are disclosed and claimed herein.

DETAILED DESCRIPTION OF EXEMPLARY EMBODIMENTS

One aspect of the invention is to provide a networking device which receives data on a first network interface in accordance with a first protocol, while then providing corresponding data over a second network interface according to a second protocol. In one embodiment, the networking device is a protocol bridge which couples a Fibre Channel network to a POS network. In a further embodiment, a network processor on a POS bus communicates with the protocol bridge according to the SCSI protocol.

One aspect of the invention is to provide a protocol bridge that receives and transmits data using one or more data frame formats. In one embodiment, data frames received by the protocol bridge (e.g., ASIC 10) may be divided into five modes: Target Mode, Initiator Mode, Raw Frame Mode, Control Mode, and Event Reporting Mode. In one embodiment, specific fields in the frame header may be used to determine the particular frame's destination and/or internal routing. For example, a protocol field in the frame header may be used to determine the frame type.

Another aspect of the invention is to provide a networking device which can function as a target on behalf of a network processor when performing a target mode operation. In this embodiment, the network processor may be on a POS network and the networking device may function as an FCP target. In another embodiment, the networking device may function as an initiator on behalf of the network processor. When functioning as an initiator, the networking device may function as an FCP initiator on behalf of a network processor coupled to the networking device via a POS network.

In another embodiment, the networking device may also operate in a raw frame mode. In this mode, the networking device may receive FC frames encapsulated in a POS frame from a network processor via a POS network. In one embodiment, the network processor communicates with the networking device according to a SCSI protocol.

Yet another aspect of the invention is to provide a networking device that can process and transmit frames in a different order than in which they were received. In one embodiment, this enables the networking device to give a higher priority to incoming frames that belong to a specific I/O context, and a lower priority to some other categories of data frames. In one embodiment, control mode frames, which are used to provide control information to the networking device, may be given a lower priority than other incoming data frames.

I. System Overview

A. Hardware Design

Figures 1, 1A:
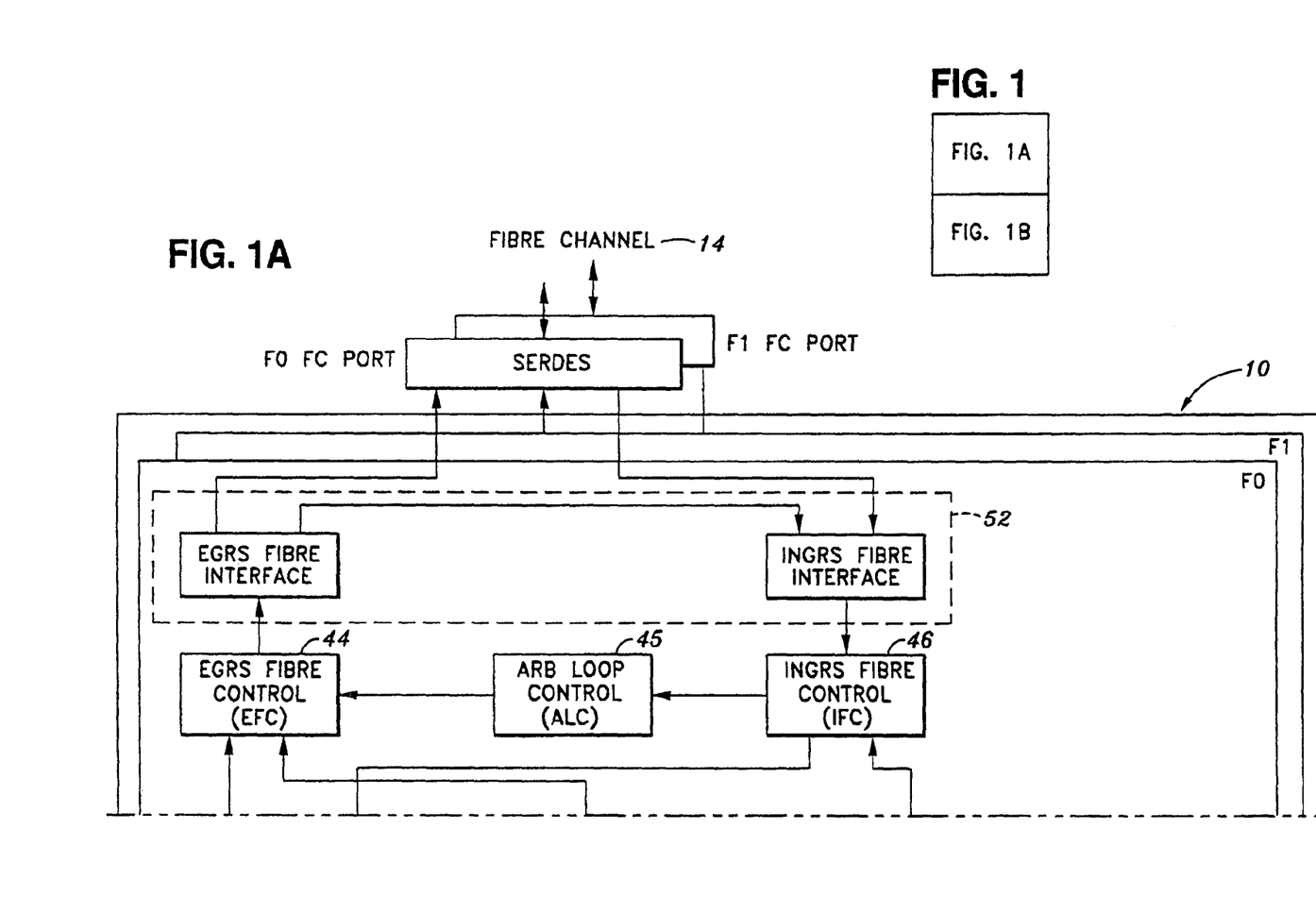
FIGS. 1A-1B illustrate a block diagram of one embodiment of an ASIC capable of carrying out one or more aspects of the present invention.
Figure 1B:
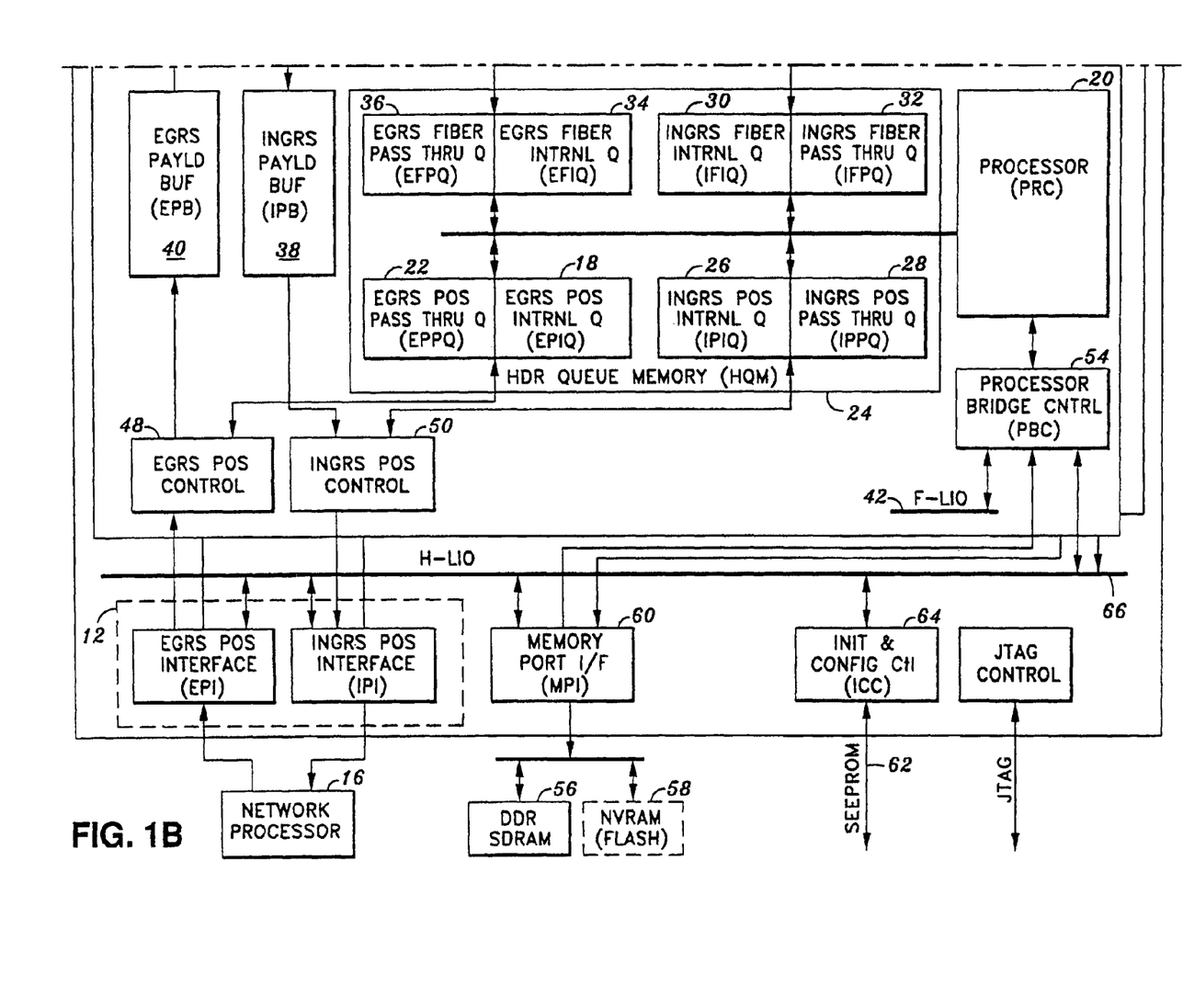

Referring now to FIGS. 1A-1B, in which a block diagram of one embodiment of an ASIC 10 capable of carrying out one or more aspects of the present invention is illustrated. In the embodiment of FIGS. 1A-1B, the ASIC 10 includes two Fibre Channel (FC) ports, F0 Port and F1 Port, with hardware associated with the F0 Port residing on the F0 function level and hardware associated with the F1 Port residing on the F1 function level. It should be appreciated, however, that there may be more or fewer FC ports and one or more of the hardware components for different FC functions may be integrated onto the same function level.

Ingress (Ingrs) and egress (Egrs) references in FIGS. 1A-1B describe the data path direction between the POS interface 12 and the Fibre Channel 14. However, while FIGS. 1A-1B and the following description are directed to sending and receiving data between a Fibre Channel interface and a POS interface, it should equally be appreciated that the principles of the invention may similarly be applied to other network protocols and other applications. For example, rather than having a POS interface 12 coupled to a POS network, the interface may be a System Parallel Interface (a/k/a System Packet Interface), Utopia or the interface marked by AMCC Inc. under the name Flex-BUS™. Similarly, rather than having a Fibre Channel interface coupled to Fibre Channel 12, ASIC 10 may be interfaced to an IEEE-1394, Infiniband, and/or iSCSI network. However, for brevity the following discussion with refer to only POS networks and Fibre Channel.

The Network Processor 16 may be any processor with which the ASIC 10 interfaces through the POS interface. The Egress POS Internal Queue (EPIQ) 18 may contain headers of frames received from the POS interface 12. In one embodiment, POS frames that will be processed by the internal embedded processor (PRC) 20 are routed to the EPIQ 18. While in one embodiment PRC 20 is a RISC processor, it may also be a Programmable Sequencer or be comprised of one or more Hardware Finite State Machines (FSM). Similar processing engines may also be used. The Egress POS Pass Through Queue (EPPQ) 22 may contain headers of POS frames received from the POS interface, where the payloads for such POS frames are intended to pass through the ASIC 10 to Fibre Channel 14. In the embodiment of FIG. 1B, both EPIQ 18 and EPPQ 22 are components of Header Queue Memory (HQM) 24.

Continuing to refer to FIGS. 1A-1B, the Ingress POS Internal Queue (IPIQ) 26 may contain headers of POS frames that have been generated by PRC 20. In addition, the Ingress POS Pass Through Queue (IPPQ) 28 may contain headers for POS frames whose payloads were received from the Fibre Channel 14. Ingress Fibre Internal Queue (IFIQ) 30, as shown in FIG. 1B, may contain headers of frames received from the Fibre Channel 14. In one embodiment, FC frames whose payloads will be processed by the PRC 20 may be routed to the IFIQ 30. Moreover, Ingress Fibre Pass Through Queue (IFPQ) contains headers of frames received from the Fibre Channel 14, according to one embodiment. FC frames whose payloads will pass through the ASIC 10 to the POS interface 12 may be also be routed to the IFPQ 30.

In the embodiment of FIG. 1B, the Egress Fibre Internal Queue (EFIQ) 34 may contain headers of FC frames that have been generated by the PRC 20. In that case, the frames may be sent out on the Fibre Channel 14. Moreover, the Egress Fibre Pass Through Queue (EFPQ) 36 contains headers of FC frames whose payloads were received from the POS interface 12, according to another embodiment.

In one embodiment, the memory queues of HQM 24 (e.g., EFPQ 36, EFIQ 34, EPPQ 22, EPIQ 18, IFIQ 30, IFPQ 32, IPIQ 26, and IPPQ 28) may be implemented using shared dual-port RAM that is accessible by the ASIC 10 hardware logic as well as PRC 20.

The Egress POS Control (EPC) 48 module may be used to provide read functionality to transfer data from the Network Processor 16 (or associated memory) to the Egress Payload Buffer (EPB) 40 module or to the Egress POS queue memory of HQM 24. Similarly, the Ingress POS Control (IPC) 50 module may be used to provide the DMA write function to transfer data to the Network Processor 14 (or associated memory) from the Ingress Payload Buffer (IPB) 38 module or the Ingress POS queue memory of HQM 24.

The IPB 38 of FIG. 1B may contain payloads for frames that will be sent to the POS Interface 12. It should be appreciated that the payloads may have come from the Fibre Channel 14 or may have been created internally by the PRC 20. Moreover, the EPB 40 may contain payloads for frames that will be sent out on the Fibre Channel 14, where the payloads may either have come from the POS interface 12, or may have been created by the PRC 20.

The Fibre Channel interface provides the interface and control between the Fibre Channel and the ASIC 10. In the embodiment of FIGS. 1A-1B, the Fibre Channel interface consists of 4 major modules—the Egress Fibre Channel Control (EFC) 44, Arbitrated Loop Control (ALC) 45, Ingress Fibre Channel Control (IFC) 46 and Fibre Channel Interface (FCI) 52 modules. In particular, the EFC module 44 may be used to provide the frame flow control mechanism of the FC transmitting port (i.e., F0 or F1), while other operations which may be performed by the EFC module 44 include frame assembly, CRC generation, and retransmission of certain data from the ALC module 45 (e.g., L_Port data). In one embodiment, the EFC module 44 assembles and transmits frames to the FCI module 52 based on the data from HQM 24, EPB 40, and the ALC module 45.

In the embodiment of FIG. 1A, the ALC module 45 is located between the IFC module 46 and EFC module 44. In one embodiment, this module consists primarily of a Loop Port State Machine (LPSM) whose main function is to continuously monitor the data stream coming from the IFC module 46. The LPSM may further be used to monitor commands from the PRC 20 and the EFC module 44. In one embodiment, the EFC 44 may send a command to the LPSM which defines the function to be performed by the ALC module 45 such as loop arbitration, open loop, close loop, etc. In another embodiment, the LPSM may be controlled by the PRC 20.

In one embodiment, the ALC module 45 may be used to detect different primitive signals or sequences (e.g., LIP, LPE, LPB, MRK, NOS, OLS, LR and LRR) and respond accordingly. In the loop topology, data from the IFC module 52 may be either passed on to the EFC module 44, or substituted with a primitive sequence depending on the function to be performed. The substitution may be either by the state machine itself or signaled from the EFC module 44.

The IFC module 36 may receive a data stream from the FCI module 52 and provides functions that may include frame disassembling, frame header matching and routing, FC_FS primitive signal and sequence detection, CRC checking and link interface integrity measurement. In one embodiment, the data received from the FCI module 52 is passed on to the ALC module 45 for retransmission during a private/public loop (L_Port) monitoring state. When not in the monitoring state, each frame received may be examined and routed to the appropriate destination modules. If the frame has a payload, the payload may be written into the next available buffer segment in the IPB module 38, according to one embodiment.

The Processor Bridge Controller (PBC) module 54 provides the interfaces that connects the embedded processor (e.g., PRC 20) to the rest of the ASIC 10 hardware. In the embodiment of FIG. 1B, PRC 20 is coupled to the PBC module 54 via a PIF bus, which may be a general purpose I/O bus that supports burst reads and writes as well as pipelined single access reads and writes. In another embodiment, PRC 20 can also use the PBC module 54 to interface with external memory devices such as DDR/SDRAM 56 and NVRAM 58 attached to the ASIC 10 through the Memory Port I/F (MPI) module 60, or SEEPROM 62 through the Initialization and Configuration Control (ICC) module 64. In yet another embodiment, the PBC module 54 may also provide bidirectional bridging between the F_LIO bus 42 and Host Local I/O (H_LIO) bus 66. In one embodiment, F_LIO bus 42 may be used to provide access to registers in other hardware blocks through arbitration.

As previously mentioned, the MPI module 60 may be used to provide arbitrated accesses to external memory (e.g., DDR SDRAM 56 and/or NVRAM 58) devices by the PRC 20, as well as to every bus master on the internal H_LIO bus 66.

In one embodiment, the ICC module 64 includes a Serial Memory Control (SMC) module, which can be used to initialize internal registers and provide read/write access to SEEPROM 62. The ICC 48 may also include a trace control module (not shown) to provide external visibility of the internal signals.

B. Frame Egress

In the embodiment of FIG. 1A-1B, each frame that is received from the POS interface 12 may be routed to one of the two FC function levels (F0 or F1). As mentioned previously, there may be more or fewer than two FC function levels, in which case the frames received from the POS interface 12 would be routed to whatever number of available FC function levels there may be. In one embodiment, frames are routed based (at least in part) on a port routing byte in a given frame header. In one embodiment, the port routing byte is located in the third byte of the frame header, although it should of course be understood that the port routing byte may be located elsewhere in the frame.

After the frame arrives at the selected function (e.g., F0 or F1 in this embodiment), a second routing decision may then be made based on a path routing bit. In one embodiment, the path routing bit is located in the POS frame header, and may be located in one of the first four bytes of the POS frame header. The path routing bit may be used to determine whether the frame will be routed to the "Pass-Through Path" or to the "Internal Path," where the Pass-Through Path is for frames containing payloads that are going to be sent out on Fibre, and the Internal Path is for frames whose payload contains configuration or control information that will be used by the PRC 20 and not sent out on Fibre.

In one embodiment, after the above-described routing decisions have been made, the received frame header is stripped from the payload and is stored in an entry in a buffer such as an Egress POS Queue (e.g., EPPQ 20 or EPIQ 18) that is dedicated to the selected function/path. A programmable number of bytes from the payload may also be stored along with the HQM 24. The payload may then separated from the frame and stored in the next available segment of the EPB 40 for the given FC function (F0 or F1). A handle indicating which payload segment was used is stored by hardware in the HQM 24 queue which received the POS frame header.

In the case where the frame was routed to the Pass-Through Path, a portion of the frame header may be compared with the corresponding bytes from the previous frame's header. If the contents of the bytes are equal, a 'header match' bit in the HQM 24 entry may be set indicating that the frames belong to the same context. It should be noted that the location of the bytes to be compared may be programmable via a bit mask. At this point, the PRC 20 may be notified that a frame has been received, while in another embodiment the PRC 20 is notified before the entire payload has been received.

It should be appreciated that the PRC 20 may undertake a variety of operations at this point which may dependent upon several factors, including the path and contents of the frame, whether initialization has been completed, and in the case of an FCP frame, whether a command context already exists. Moreover, the PRC 20 may undertake a frame Pass-Through operation and/or an Internal Frame operation, as will now be described.

1. Pass-through Frame Operation

As mentioned previously, a given frame may be routed to a Pass-Through Path or an Internal Path, depending on its path routing bit. Where the frame was routed to the Pass-Through Path, the PRC 20 may be used to write the information necessary to create a suitable FC frame header. In one embodiment, the FC frame header is created in the next available entry in the EFPQ 36, although it may also be stored elsewhere. In one embodiment, the PRC 20 may also copy the payload segment handle to this EFPQ 36 entry. Moreover, if the frame belongs to the same context as the previous frame, a bit may be set in the HQM 24 entry (e.g., EFPQ 36 entry) that instructs the hardware to automatically generate portions of the FC header based on values from the most recent FC frame that was generated from that queue.

After the PRC 20 has finished setting up the outgoing frame header, control of the HQM 24 entry may then be turned over to the hardware by setting a bit in the entry's control word. Other methods for releasing the entry may also be used. Once control of the HQM 24 entry has been turned over to the hardware, the entry may then be queued up for transmission from one of the FC Ports. In one embodiment, frames that are released to the hardware are sent out on the FC Ports in the order in which they were released by the PRC 20. However, it should be appreciated that frames may be sent out in any number of other orders.

After the PRC 20 has set up an outgoing entry in the EFPQ 36, it may release the entry in the incoming EPPQ22. In one embodiment, the entry is released by resetting a bit in the control word of the entry. Once released, the entry location may be reused for another egress POS frame header.

When the entry in the EFPQ 36 reaches the head of an HQM 24 queue, the hardware may automatically assemble an FC frame and send it out on the Fibre Channel 14, according to one embodiment. According to another embodiment, when this has been completed the hardware puts the completion status of the operation into the EFPQ 36 entry, and turns the entry over to the software. The EPB 40 segment may be returned to the free pool, or it may be returned by the PRC 20 after it checks the completion status in the HQM 24 entry.

2. Internal Frame Operation

If, on the other hand, the frame was routed to the Internal Path, the payload may be intended for use by the PRC 20. A programmable number of payload bytes may be made available to the PRC 20 in the entry in the EPIQ 18. In one embodiment, the EPIQ 18 may be made available to the PRC 20 in zero-wait-state memory. Moreover, additional payload bytes may be made available to the processor via the F_LIO bus 42 (e.g., F0_LIO and F1_LIO).

After the PRC 20 has finished processing the information from the frame, it may release the entry in the EPIQ 18 to the hardware by resetting a bit in the control word of the entry. In one embodiment, the PRC 20 returns the payload buffer segment to the free pool by writing a segment handle to the payload segment release register.

3. Special Payload Buffer

If the PRC 20 needs to generate an egress FC frame, in one embodiment it may do so using the EFIQ 34 and a Special Payload Buffer (not shown). In one embodiment, the Special Payload Buffer is a single segment buffer consisting of 512 bytes and resides in zero-wait-state processor memory. After the PRC 20 has put the required information into the HQM 24 entry (e.g., in the EFIQ 34 entry) and Special Payload Buffer, the frame may then be released to the hardware by setting a bit in the HQM 24 entry, causing the frame to be sent out when the entry reaches the head of the particular queue.

4. Optional Headers

When a POS frame is received, its payload may be placed into an entry in the EPB 40. For Pass-Through payloads, the PRC 20 may occasionally be required to insert an optional FC header between the FC header and the payload received from the POS interface 12. In order to accommodate this, a predetermined number of bytes may be allocated in each entry in the egress FC Header queues (e.g., EFPQ 36 and EPPQ 22). In one embodiment, the predetermined number of bytes is 72 bytes. When the PRC 20 needs to insert an optional header, it writes the header to one or more of these spare byte locations in the HQM 24 entry, according to one embodiment. In addition, the PRC 20 may write the length of the optional header to a field (e.g., imm_datafld_size field) of the HQM 24 entry. Once the given HQM 24 entry has been turned over to the hardware and has reached the head of the queue, the entry may be sent out to the Fibre 14. In one embodiment, the FC header is sent out first, followed by the bytes containing the optional FC header, followed by the payload. If multiple FC frames are generated from one entry in an FC Header queue, the hardware may be configured to include the optional header in each FC frame, or alternatively, in only the first frame.

5. Raw Frames

Raw FC frames may be received from the POS interface 12 and sent out on the Fibre Channel 14 using the same process used with Pass-through frames described above in Section I.B.1. As is described in co-pending U.S. patent application Ser. No. 10/445,105, entitled "Method and Apparatus for Processing Raw Fibre Channel Frames," filed on May 23, 2003, the contents of which are incorporated herein by reference, the POS frame header may be stripped off and placed into an entry in the EPPQ 22, while the encapsulated FC raw frame may be automatically placed into the next available segment of the EPB 40.

After the PRC 20 has been notified of the arrival of the POS frame, it may then perform the steps described above in Section I.B.1., except that a bit may be set in the EFPQ 36 that direct the system to take most the information needed to build the FC frame header from the raw FC frame in the EPB 40, rather than from the HQM 24 entry. Additional bits in the HQM 24 entry may be used by the PRC 20 to determine which mechanism will be used to generate the CRC ("Cyclic Redundancy Check") checksum for the Fibre Channel 14 frame.

6. Cut-Through and Store-Forward Modes

In embodiment, ASIC 10 may provide two modes of operation. With the first mode, referred to herein as the Store-Forward mode, frames are received in their entirety from the POS interface 12 before they are sent out on the Fibre Channel 14. Alternatively, as mentioned above, one aspect of the invention is to implement a Cut-Through mode. As is described in co-pending U.S. patent application Ser. No. 10/435,214, entitled "Method and Apparatus for Implementing a Data Frame Processing Model," filed on May 8, 2003, the contents of which are incorporated herein by reference, after a frame header and a programmable number of payload bytes have been received from the POS interface 12 in this mode, the frame may be output on the Fibre Channel 14. Thus, receiving and sending operations may overlap. In one embodiment, Cut-through mode may be enabled on a frame-by-frame basis.

7. Small FC Frames

Some Fibre Channel devices may negotiate a maximum FC payload size that is less than a nominal size, which in one embodiment is just over 2 KB. In one embodiment, this negotiated size may be 512 bytes, although other sizes may also be negotiated. In such a case, ASIC 10 may allow the Network Processor 16 to send nominal sized POS frames (e.g., 2 KB) to the ASIC 10 for such devices, but will segment the POS frame into multiple FC frames to accommodate the smaller negotiated FC payload size.

When a POS frame is received by the ASIC 10, the header and payload may be separated and routed to the EPPQ 22 and EPB 40 in the same manner described above for Pass-Through operations. In order to accommodate the smaller negotiated FC payload size, when the PRC 20 sets up an outgoing FC frame header in the EFPQ 36, it may indicate the negotiated size of the FC payload for a given device in the field in the HQM 24 entry (e.g., the 'maximum-send-size' field).

By way of a non-limiting example, the maximum-send-size field may be programmed with a value of 512 bytes instead of the nominal value of 2K. The remainder of the fields in the FC HQM 24 entry may then be filled in by the PRC 20 in the usual manner, after which the entry is released to the hardware. When the entry in questions in the EFPQ 36 reaches the head of the queue, the value in the 'maximum-send-size' field may be compared to the value in another field (e.g., the 'expected-payload-size' field) of the same entry. If the 'expected-payload-size' field is larger, the system will generate multiple Fibre Channel frames. While in one embodiment, the generated multiple FC frames each have the payload size indicated by the 'maximum-send-size' field, it should be appreciated that they may also have smaller payload sizes. In one embodiment, the generated FC frame use information from the original HQM 24 entry, while in another embodiment, the hardware automatically increments certain fields in the subsequent FC headers, such as the SEQ_CNT and Relative Offset fields.

Moreover, if the FC HQM 24 entry indicates that the data contained in the payload is the last data in an FC sequence, or that the FC Sequence Initiative should be transferred, the appropriate bits may be set in the header of only the last FC frame that is generated.

8. Jumbo Frames

Another aspect of the invention is for the ASIC 10 to be configurable to accept normal frames, jumbo frames, or an intermix of normal and jumbo frames from the POS interface 12. For purposes of the present discussion, a normal frame is defined as a frame whose payload can fit into a single segment of the EPB 40, while a jumbo frame is a frame whose payload spans two or more segments of the EPB 40. In one embodiment, the maximum size of a jumbo frame is configurable up to a maximum of 32K bytes.

When a jumbo frame is received on the POS interface 12, the system may automatically allocate the necessary number of EPB 40 segments to hold the frame. Also, the system may allocate an entry in the EPPQ 22 for each EPB 40 segment that is allocated. These additional HQM 24 entries do not contain copies of the POS header, according to one embodiment. Instead, they may merely contain a pointer to a EPB 40 segment and indicate that the buffer segment contains overflow data belonging to the previous entry(ies) in the POS queue of the HQM 24.

While a jumbo frame is being received on the POS interface 12, the POS HQM 24 entries that are associated with each new EPB 40 segment may be turned over to the processor incrementally as each EPB 40 segment is allocated. In one embodiment, each time the PRC 20 receives a POS HQM 24 entry, it sets up an entry in the FC queue of the HQM 24, copies the EPB 40 segment handle to it, and turns the FC HQM 24 entry over to the hardware. Using this mechanism, the hardware may send an FC frame containing the first portion of a jumbo frame payload out on the Fibre Channel 14 while the remainder of the jumbo frame payload is still being received on the POS interface 12.

Since all of the FC frames generated from a jumbo frame will typically belong to the same context, the system is only required to set up a full FC header for the first FC frame. In one embodiment, the hardware may be programmed to automatically generate the FC headers for each subsequent FC frame based on information from the preceding frame, as described in co-pending U.S. patent application Ser. No. 10/434,872, entitled "Method and Apparatus for Controlling Information Flow Through a Protocol Bridge," filed on May 8, 2003, the contents of which are incorporated herein by reference.

If the final FC frame generated from a jumbo frame will be required to transfer the FC Sequence Initiative, or to end a sequence, the PRC 20 should know in advance what the overall length of the jumbo frame will be. In one embodiment, this may be accomplished by including a frame size field in the header of the POS jumbo frame.

9. Arbitration

In one embodiment, egress FC Frames may originate in either the EFPQ 36 or the EFIQ 34. At any point in time, there may be multiple FC frame headers in each of these queues waiting to go out on the wire.

Within each queue, FC frames will be output in the order in which they were released to the hardware, according to one embodiment. However, the same principle need not apply between queues. For example, frames that are waiting in one queue may be delayed while newer frames in the other queue go out on the Fibre 14.

In one embodiment, the arbitration algorithm has two settings: 'ping-pong' and 'sequence'. When the arbiter is programmed for ping-pong mode, egress FC frames may be taken from the EFPQ 36 and the EFIQ 34 in alternating order, one at a time from each queue. When the arbiter is programmed for sequence mode, frames from the EFPQ 36 which belong to the same command context as the previous frame may be given priority. Thus, once a context begins, all frames belonging to it may be transmitted. In such a case, at the end of each context (or when the queue is empty), a frame from an FC Internal Queue (e.g., the EFIQ 34) may then be transmitted.

10. Egress Error Handling

Error handling may be accomplished using one or both of hardware error detection and software error recovery procedures. The following will describe one embodiment of the hardware detection capabilities of the ASIC 10 egress path.

Each POS frame received by the ASIC 10 will typically contain a Frame CRC checksum. When an error is detected in this checksum, a status bit may be set in the segment of the EPB 40 that received the payload, according to one embodiment. The manner in which the error may be handled is dependent (at least in part) on whether the frame header was routed to the Pass-Through Path or to the Internal Path.

If the header was routed to the Internal Path, the PRC 20 may be notified of the arrival of the frame after the payload has been fully received. In this embodiment, the PRC 20 would check the receive status before processing the payload. If this check reveals that a receive error occurred, a software recovery procedure may be called. In one embodiment, part of the software recovery procedure would include returning the EPB 40 segment to the free pool, and releasing the HQM 24 entry to the hardware.

If the header was routed to the Pass-Through path, the PRC 20 may be notified of the arrival of the POS frame after the header is received, but while the payload is still in transit. Upon notification of the arrival of the POS header, the PRC 20 may create an FC header in an entry in the EFPQ 36 and release the entry to the hardware. This will normally occur before the POS CRC error is detected.

In order to handle this situation, the hardware that assembles the outgoing FC frames may be designed to examine the receive status field of the EPB 40 segment before it initiates the FC frame. If the status field indicates that a problem was encountered while receiving the POS frame, in one embodiment the state machine may transfer this status information to the entry in the EFPQ 36, turn the entry over to the software, and halt without outputting the FC frame. The software may then decide how to recover from the error. In one embodiment, part of the recovery procedure would include returning the EPB 40 segment to the free pool and returning the FC HQM 24 entry to the hardware.

If Cut-Through mode is enabled, the system may start sending out FC frame before the POS CRC error is detected. Such an error will typically be detected, however, before the end of the FC frame has been transmitted. When this occurs, the hardware will end the FC frame with an EOF, according to one embodiment. In another embodiment, the status field of the entry in the FC HQM 24 may be updated with information about the error, the entry turned over to the software, and the hardware state machine halted. It should be appreciated that the software may then decide how to recover from the error.

Moreover, an additional hardware feature may be provided to help minimize the software recovery process. In one scenario, the frame with the CRC error advanced to the head of the EFPQ 36 before the software became aware of the error. By that time, the HQM 24 could have contained headers of additional frames belonging to the same context. Furthermore, these frames could be interleaved with frames from other contexts. In order to allow the PRC 20 to easily purge frames belonging to a specific context from the HQM 24, a 'skip' bit may be provided in each entry in the HQM 24. When an error is detected, the PRC 20 can examine each subsequent entry in a particular queue and set the skip bit in each frame it wants to purge. In one embodiment, this may be done before the PRC 20 re-enables the hardware. Once re-enabled, the hardware may process the HQM 24 in order, beginning with the entry after the one with the error. Thus, in this embodiment, each time an entry in which the skip bit set reaches the head of queue, its contents may be ignored and returned to the software, and the next entry processed.

Errors may also be encountered by the Egress Fibre Control (EFC) 44 module while sending FC Frames out on the wire. Such errors may be posted in the HQM 24 entry which originated the frame. After each FC frame is completed, either successfully or un-successfully, the HQM 24 entry that originated the frame may be returned to the software. The PRC 20 may then examine the status field of the entry and if required, take appropriate recovery action.

One additional error condition may occur if Cut-Through mode is improperly set up. An error (e.g., 'buffer underrun') can occur when a frame is being simultaneously received on the POS interface 12 and sent out on the Fibre 14. The error occurs if the speed on the sending side is greater than the speed on the receiving side and the buffer runs out of data to send. If this occurs, the logic that generates the FC Frame may terminate the frame with an EOF. The status field of the FC HQM 24 entry that originated the frame may then be filled in with information indicating the action taken, and the entry may be turned over to the software. In one embodiment, the processing of FC frames from the Pass-through path is then halted. The software then has the option of re-transmitting the frame using the original HQM 24 entry, re-transmitting it using a new HQM 24 entry, or executing a recovery protocol.

C. Frame Ingress

Each frame that is received from the Fibre Channel 14 may be routed to either the "Pass-Through Path" or the "Internal Path." In one embodiment, the Pass-Through Path is for frames containing payloads that will be sent out on the POS interface 12, while the Internal Path is for frames whose payload contains initialization, configuration or control information that will be used by an internal processor (e.g., PRC 20), but not sent out on the POS interface 12. In one embodiment, the path to which the frame is routed is based on the contents of the R_CTL field in the FC frame header.

After the routing decision has been made, the frame header may be stripped from the payload and stored in an entry in one of the two ingress FC Header Queues, according to the path (Pass-Through or Internal) that has been chosen. A programmable number of bytes from the payload may also be stored along with the header in the selected Header Queue entry. In the embodiment of FIG. 1B, the two ingress FC Header Queues are the IFIQ 30 and the IFPQ 32.

In one embodiment, the header of the incoming FC frame is compared to the header of the most recent FC frame that was routed to the same path. If certain fields match, a bit in the status field of the FC HQM 24 entry may be set indicating that the frame belongs to the same context and is sequential.

The payload may then be separated from the frame and stored in the next available segment of the IPB 38, according to one embodiment. A handle indicating which payload segment was used may also be stored in the FC HQM 24 entry that received the FC frame header. While in one embodiment the PRC 20 is notified that a frame has been received after the entire payload had been received, in another embodiment, this notification may occur before the entire payload has been received.

It should be appreciated that the PRC 20 may undertake a variety of operations at this point. The PRC 20 operation may be dependent upon several factors, including the path and contents of the frame, whether initialization has been completed, and in the case of an FCP frame, whether a command context already exists. Moreover, the PRC 20 may undertake a frame Pass-Through operation and/or an Internal Frame operation, as will now be described.

1. Pass-through Frame Operation

If the frame was routed to the Pass-Through path, the header would have been placed in an entry in the IFPQ 32, according to one embodiment. When the entry is turned over to the PRC 20, the PRC 20 may examine it and write the information necessary to create a suitable POS frame header in the next available entry in the IPPQ 28. A payload handle may also be copied from the FC HQM 24 entry to the POS HQM 24 entry. In another embodiment, if the frame belongs to the same context as the previous frame, it may use a mask field in the POS HQM 24 entry to tell the hardware to reuse portions of the previous POS frame header.

After the PRC 20 has finished setting up the outgoing POS frame header in the IPPQ 28, it may release the entry to the hardware. In one embodiment, this is done by setting a bit in the entry's control word. When the entry reaches the head of the queue, the hardware may automatically assemble the POS frame and send it out on the POS interface 12.

After the PRC 20 turns the entry in the IPPQ 28 over to the hardware, it no longer needs the entry in the IFPQ 32. Thus, in one embodiment the IFPQ 32 entry is released to the hardware for use by another Ingress FC frame by setting a bit in the entry.

When the entry in the IPPQ 28 reaches the head of a given queue, the hardware may then assemble a POS frame and send it out on the POS interface 12. When this has been completed, the completion status may be put into the outgoing HQM 24 entry that originated the frame, and the entry turned over to the software. Moreover, the payload buffer segment may be returned to the free pool, or it may be returned by the PRC 20 after the PRC 20 checks the completion status in the HQM 24 entry.

2. Internal Frame Operation

If the frame was routed to the Internal Path, the payload may be used by an internal processor (e.g., PRC 20). In one embodiment, a programmable number of payload bytes are available to the PRC 20 in the IFIQ 30, which may also be accessible to the PRC 20 in zero-wait-state memory. In another embodiment, additional payload bytes may be examined by the PRC 20 via the F_LIO bus 42.

After the PRC 20 has completed processing the FC HQM 24 entry, it may then return the entry to the hardware by setting a bit in the control word of the entry. The payload buffer segment may also be returned to the free pool by writing the segment's handle to a register (e.g., "Payload Segment Release Register").

3. Special Payload Buffer

If the embedded processor (e.g., PRC 20) needs to generate an ingress POS frame, it may do so using the IPIQ 26 and the Special Payload Buffer. In one embodiment, the Special Payload Buffer is a single segment buffer consisting of a predetermined number of bytes (e.g., 512 bytes) and resides in zero-wait-state processor memory. It should, however, be appreciated that other buffer configurations may also be used.

It should also be understood that the use of the Special Payload Buffer is optional, and will typically be used where the payload of the frame is too large to fit into the spare bytes in the Header Queue entry. By way of a non-limiting example, when a nominal configuration of 128 bytes per Header Queue entry is used, there are 96 bytes available in each HQM 24 entry for a POS header and POS payload. If the total number of bytes of the frame to be sent is 92 or less, the entire frame can be put into an HQM 24 entry. Otherwise, the Special Payload Buffer may be used.

After the PRC 20 has put the required information into the HQM 24 entry and Special Payload Buffer, it may then turn the frame over to the hardware by setting a bit in the HQM 24 entry. In one embodiment, the hardware will queue the entry and send the frame out on the Fibre 14 when the entry reaches the head of the queue.

4. Optional Headers

When an FC frame is received, the FC header may be separated from the payload and stored in one of the two ingress FC Header Queues (Internal or Pass-Through). In one embodiment, a programmable number of additional bytes from the FC frame are also stored in the Header Queue entry (e.g., HQM 24 entry). In another embodiment, the complete payload (everything after the FC header) may be stored in the next available segment of the IPB 38. If the bytes following the FC header contain an optional header, it may be located in the beginning of the payload buffer segment, as well as in the HQM 24 entry. In one embodiment, the PRC 20 may examine the optional header by reading it from the HQM 24 entry.

If the payload is to be forwarded to the POS interface 12, the PRC 20 may choose to exclude the optional FC header from the POS frame. In one embodiment, this is done by indicating the length of the optional header in a field (e.g., the "segment offset" field) of the ingress POS header queue entry that it generates for the frame. When the payload is transferred, the hardware may then skip the number of bytes indicated by this field when it takes the payload from the IPB 38.

5. Raw Frames

As described in previously incorporated co-pending U.S. patent application Ser. No. 10/445,105, a frame that has been received on the Fibre Channel 14 may be fully encapsulated into a POS frame and sent out on the POS interface 12. In one embodiment, there are two modes available to accomplish this operation, with the first mode being a dedicated raw frame mode and the second mode being an interleave mode. In one embodiment, the interleave mode allows normal frames to be interleaved with raw frames during processing.

6. Cut-Through and Store-and-Forward Modes

In embodiment, ASIC 10 may provide two modes of operation. With the first mode, referred to herein as the Store-and-Forward mode, frames are received in their entirety from the Fibre Channel 14 before they are sent out on the POS interface 12. Alternatively, a Cut-Through mode may be used. As described in previously incorporated co-pending U.S. patent application Ser. No. 10/435,214, after a frame header and a programmable number of payload bytes have been received on the Fibre Channel 14 in this mode, the frame may be output on the POS interface 12. Thus, receiving and sending operations may overlap. In one embodiment, Cut-through mode may be enabled on a frame-by-frame basis.

7. Arbitration

In one embodiment, ingress POS Frames may originate in either the IPPQ 28 or the IPIQ 26. At any point in time, there may be multiple POS frame headers in each of these queues waiting to go out on the POS interface 12.

Within each queue, POS frames will be output in the order in which they were released to the hardware, according to one embodiment. However, the same principle need not apply between queues. For example, frames that are waiting in one queue may be delayed while newer frames in the other queue go out on the POS interface 12.

In one embodiment, the arbitration algorithm has two settings: 'ping-pong' and 'sequence'. When the arbiter is programmed for ping-pong mode, ingress POS frames may be taken from the IPPQ 28 and the IPIQ 26 in alternating order, one at a time from each queue. When the arbiter is programmed for sequence mode, frames from the IPPQ 28 which belong to the same command context may be given priority. Thus, once a context begins, all frames belonging to it may be transmitted in an uninterrupted fashion. In such a case, at the end of each context (or when the queue is empty), a frame from the POS Internal Queue (e.g., IPIQ 26) may then be transmitted.

8. Ingress Error Handling

As with the Egress path, Ingress error handling for may be accomplished by a combination of hardware error detection and software error recovery procedures. The following will describe one embodiment of the hardware detection capabilities of the ASIC 10 ingress path.

In one embodiment, each FC frame received by ASIC 10 will typically contain a frame CRC checksum and an EOF transmission word. When a checksum error or an EOF is detected, or any other Fibre-Channel-specific error is detected during the reception of a frame, a status bit may be set in the segment of the IPB 38 that received the payload. Moreover, the manner in which the error is handled may be dependent on whether the frame header is routed to the Pass-Through Path or the Internal Path.

If the frame is routed to the Internal Path, the PRC 20 may be notified of the arrival of the frame after the payload has been fully received. The PRC 20 may then check the receive status before processing the payload. In one embodiment, if the check reveals that an error condition occurred while receiving the FC frame, a software recovery procedure is called. It should be appreciated that the software recovery procedure called may include returning the payload buffer segment to the free pool, and releasing the HQM 24 entry to the hardware.

If the frame is routed to the Pass-Through Path, the PRC 20 may be notified of the arrival of the FC frame after the header is received, but while the payload is still in transit. In one embodiment, upon notification the PRC 20 creates a POS header in the IPPQ 28 and releases the entry to the hardware. While this will normally occur before the POS CRC error is detected, it may also occur afterwards.

In order to handle this situation, the hardware that assembles the outgoing POS frames may be designed to also examine the status field of the indicated payload buffer segment before it initiates each POS frame. In such an embodiment, if the status field indicates that a problem was encountered while receiving the FC frame, the state machine may transfer this status information to the POS HQM 24 entry, turn the entry over to the software, and halt without generating the POS frame. The software may then decide how to recover from the error. In one embodiment, the recovery procedure includes returning the payload buffer segment to the free pool and returning the POS HQM 24 entry to the hardware.

If, on the other hand, Cut-Through Mode is enabled, the hardware may start sending the POS frame out before the FC receive error has been detected. The error will typically be detected, however, before the end of the POS frame has been transmitted. When this situation occurs, the hardware may be given the option (programmable) of either corrupting the outgoing POS frame CRC, or indicating a 'Receive Frame' error on the POS interface 12. In either case, the status field of the entry in the POS HQM 24 may be updated with information about the error. In one embodiment, the entry is also turned over to the software and the hardware state machine halted. In such a case, the software may then decide how to recover from the error.

In the example given above, the frame with the CRC error advanced to the head of the IPPQ 28 before the software became aware of the error. By that time, the queue could have contained headers for additional frames belonging to the same context. Furthermore, these frames could be interleaved with frames from other contexts. In order to allow the PRC 20 to easily purge frames belonging to a specific context from the queue, a 'skip' bit may be provided in each queue entry. In this embodiment, when an error is detected the PRC 20 can examine each entry in the queue and set this bit in each frame it wants to purge. Thereafter, the queue may be processed in order, beginning with the entry after the one with the error. Thus, in one embodiment, each time an entry with the skip bit set reaches the head of the queue, its contents may then be ignored, the entry returned to the software, and the next entry in the queue is processed.

II. Terminating and Bridging Network Protocols

A. Overview

As mentioned above, one aspect of the invention is to provide a networking device which receives data on a first network interface in accordance with a first protocol, while then providing corresponding data over a second network interface according to a second protocol. In one embodiment, the networking device is a protocol bridge which couples a Fibre Channel network to a POS network. In a further embodiment, a network processor on a POS bus communicates with the protocol bridge according to the SCSI protocol.

In one embodiment, data frames received by the protocol bridge (e.g., ASIC 10) may be divided into five modes: Target Mode, Initiator Mode, Raw Frame Mode, Control Mode, and Event Reporting Mode. Specific fields in the frame header may be used to determine the particular frame's destination and/or internal routing. For example, a protocol field in the frame header may be used to determine the frame type.

Another aspect of the invention is to provide a networking device which can function as a target on behalf of a network processor when performing a target mode operation. In this embodiment, the network processor may be on a POS network and the networking device may function as an FCP target. In another embodiment, the networking device may function as an initiator on behalf of the network processor. When functioning as an initiator, the networking device may function as an FCP initiator on behalf of a network processor coupled to the networking device via a POS network.

Yet another aspect of the invention is to provide a protocol bridge that can process and transmit frames in a different order than in which they were received. In one embodiment, this enables the protocol bridge to give a higher priority to incoming frames that belong to a specific I/O context, and a lower priority to some other categories of data frames. In one embodiment, control mode frames, which are used to provide control information to the protocol bridge, may be given a lower priority than other incoming data frames.

While aspects of the invention have been described above and will be described below in terms of a protocol bridge (e.g., ASIC 10), it should equally be appreciated that other types of networking devices may similarly be used to carry out the principles of the invention. Similarly, while the hardware arrangement described above in Section I with reference to ASIC 10 is one embodiment that may be used to practice the invention, numerous other hardware, software and/or firmware configurations may similarly be used.

B. Exemplary Modes of Operation

As will be discussed in more detail below, data frames received by the ASIC 10 may be divided into five modes: Target Mode, Initiator Mode, Raw Frame Mode, Control Mode, and Event Reporting Mode. In one embodiment, specific fields in the frame header may be used to determine the particular frame's destination and/or internal routing. For example, a protocol field in the frame header may be used to determine the frame type.

Moreover, for Control Mode frames, various fields in the POS frame header may take on different meanings depending on the control operation being requested. While this overlapping of field definitions in the POS frame header may be done in order to maintain a fixed sized header of a minimum length, it should be appreciated that field definitions need not overlap.

In one embodiment, another header field (e.g., FrameId field) may be used to verify the correct ordering of receiving data frames within a specific context and direction. The first data frame sent for a specific context from a specific source may start with zero and increment by one for each subsequent frame sent by that source, according to one embodiment. For example, when ASIC 10 is in Initiator Mode, the first frame of a command context (which may be a network processor sending the ASIC 10 an FCP command) will start with a FrameId of zero and all subsequent frames for this command context, from the network processor to the ASIC 10, will be one plus the value of the last frame for this command context. Similarly, the first frame from the ASIC 10 in response to this FCP command may also start with zero, with subsequent frames for this command context (from the ASIC 10), being incremented.

A. Target Mode

As mentioned above, one mode of frame formats and flows is the Target Mode. In this mode, ASIC 10 may function as a target on behalf of the network processor 16. In one embodiment, the network processor 16 is coupled to the ASIC 10 via POS interface 12, while the ASIC 10 may be coupled to an FC initiator device via one or more of the FC Ports (e.g., F0, F1, etc.). In this case, the ASIC 10 may serve as an FCP target and the data flows would be FCP commands (i) where data flows from the network processor 16 to the FCP initiator device (Read), (ii) where data flows from the FCP initiator device to the network processor 16 (Write), and (iii) where there is no data transferred. While the FCP initiator device may be any network device to which one or more of the FC Ports may be coupled, some examples include the backend of a RAID box, the backend of a storage virtualization system and a server host bus adapter.

Target Mode operations performed by ASIC 10 may be either Read or Write operations. Read operations involve data transfers from the network processor 16 to the FCP initiator device, while Write operations involve data transfers from the FCP initiator device to the network processor 16.

Figure 2A:
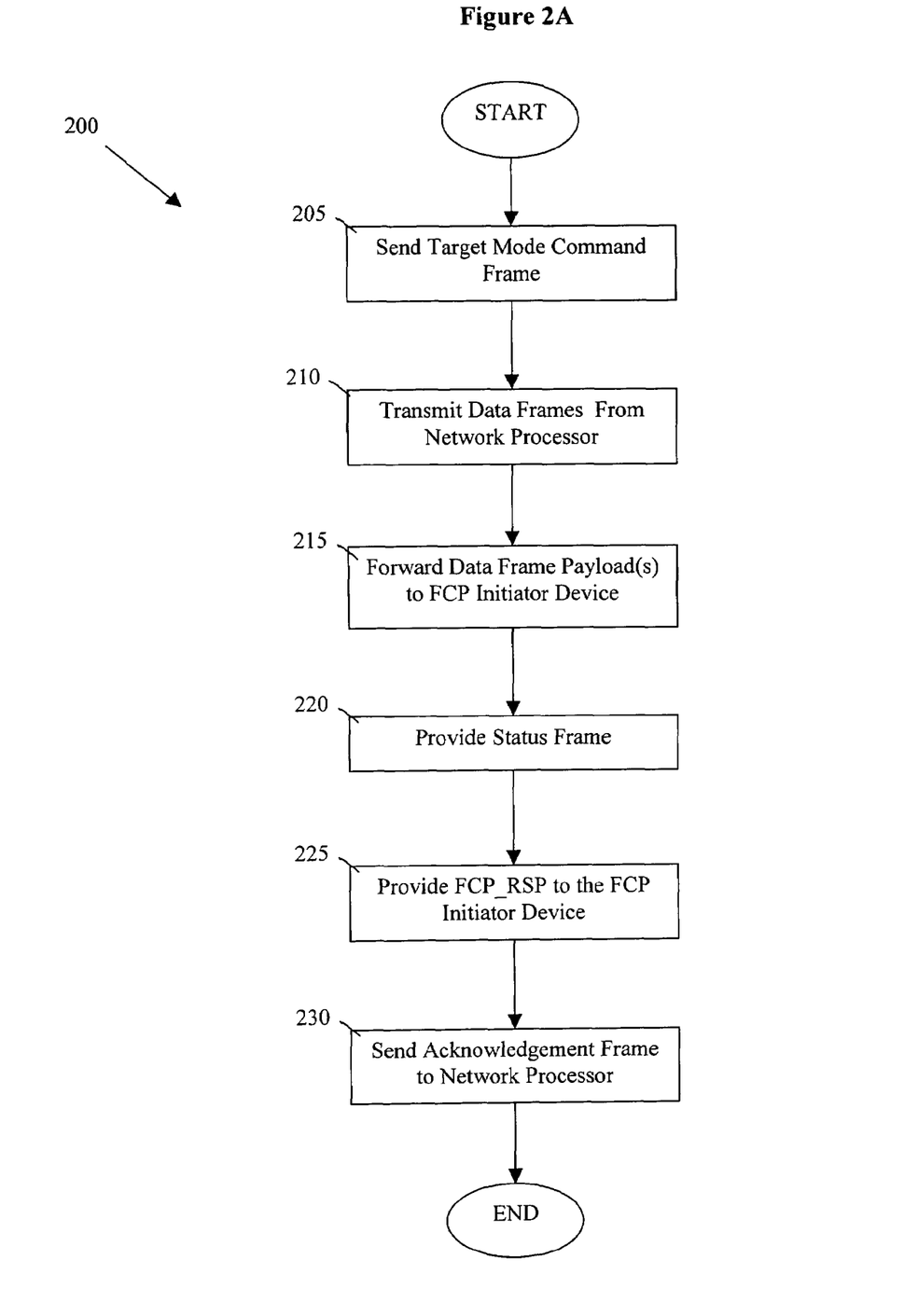
FIGS. 2A-2B are flow diagrams for processing data frames according to one embodiment of the invention; and, FIGS. 3A-3B are flow diagrams for processing data frames according to another embodiment of the invention.

FIG. 2A illustrates one embodiment of the flow of data between the ASIC 10 and the network processor 16 for a Read operation performed in Target Mode. The Read operation of process 200 may be initiated when the ASIC 10 sends a Target Mode command frame to the network processor 16 (block 205). In one embodiment, this command frame includes a device handle for the FCP initiator device and a bridge handle for the ASIC 10. In response, at block 210 network processor 16 may then provide one or more data frames to ASIC 10. In one embodiment, these data frames contain FCP payloads intended for the FCP initiator device. In another embodiment, the data frames provided by the network processor 16 include the device handle so that ASIC 10 can determine the proper command context. Thereafter, ASIC 10 may forward the payload data to the FCP initiator device (block 215). Where the data frame is a POS frame, the ASIC 10 may strip the POS header, generate an FC frame, and forward the payload with the generated FC frame.

After the network processor 16 transmit all of the requested data frames, the network processor 16 then provides a status frame to the ASIC 10 (block 220), where the status frame may include the FCP Response command (FCP_RSP). In a further embodiment, the status frame may further include a network processor handle. ASIC 10 may then, in turn, provide the FCP_RSP to the FCP initiator device at block 225. After ASIC 10 is able to successfully send the FCP_RSP, ASIC 10 then sends an acknowledgement frame back to the network processor 16 indicating that the Read operation is complete (block 230). In one embodiment, the acknowledgement frame may contain a network processor handle that the ASIC 10 received in the status frame.

Figure 2B:
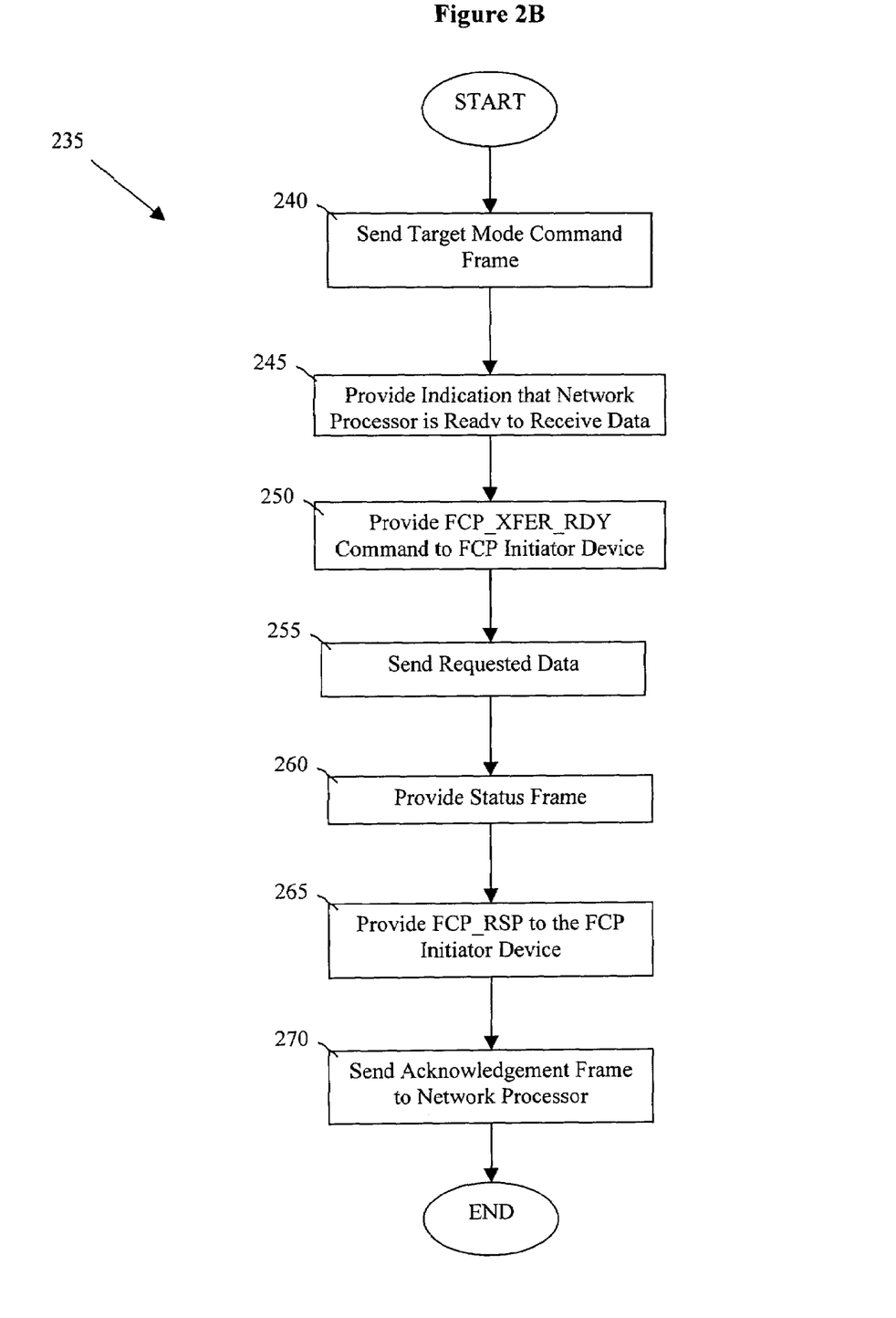

Referring now to FIG. 2B, one embodiment of the flow of data between the ASIC 10 and the network processor 16 for a Write operation performed in Target Mode is depicted. Process 235 is initiated when ASIC 10 sends out a Target Mode Command Frame to the network processor 16 (block 240). As before, this command frame may include a device handle for the FCP initiator device and a bridge handle for the ASIC 10. The network processor 16 may respond to the command frame with an indication that it is ready to receive data (block 245). In one embodiment, this indication is in the form of a Ready Frame which contains the FCP_XFER_RDY command as a payload. In another embodiment, the Ready Frame further includes a network processor handle.

At this point, process 235 continues to block 250 where ASIC 10 provides the FCP_XFER_RDY command to the FCP initiator device. Where network processor 16 is on a POS bus, Ready Frame may be a POS Ready frame, in which case the ASIC 10 may strip the POS header, generate an FC frame, and forward the payload (i.e., FCP_XFER_RDY command) with the generated FC frame to the FCP initiator device. In response, the FCP initiator device may then send out the requested FCP data in the form of one or more FC data frames to the ASIC 10, which may then be forwarded by the ASIC 10 to the network processor 16 (block 255). ASIC 10 may provide the requested data to the network processor 16 in the form of one or more POS data frame when the network processor 16 is on a POS bus. In another embodiment, the data frames may further include the network processor handle that was received from the network processor 16 with the Ready Frame.

Depending on the amount of data requested, there may be one or more Ready Frames followed by one or more data frames (e.g., POS data frames). In any event, after all of the requested data has been received, the network processor 16 may then send a Status Frame to the ASIC 10 (block 260), where the Status Frame may include the FCP Response command (FCP_RSP). In a further embodiment, the status frame may further include a handle for ASIC 10. ASIC 10 may then, in turn, provide the FCP_RSP to the FCP initiator device at block 265. After ASIC 10 is able to successfully send the FCP_RSP, ASIC 10 then sends an acknowledgement frame back to the network processor 16 indicating that the Write operation is complete (block 270). In one embodiment, the acknowledgement frame may contain a network processor handle that the ASIC 10 received in the Ready Frame.

Finally, as mentioned above, in another embodiment Target Mode commands may be sent from ASIC 10 to the network processor 16 without including any additional data frames.

B. Initiator Mode

Initiator Mode frames are used whenever the ASIC 10 is acting as an FCP Initiator on behalf of the network processor 16. For this mode, the possible data flows are FCP commands (i) where data flows from the network processor 16 to the FCP initiator device (Write operation), (ii) where data flows from the FCP initiator device to the network processor 16 (Read operation), and (iii) where there is no data transferred.

Figure 3A:
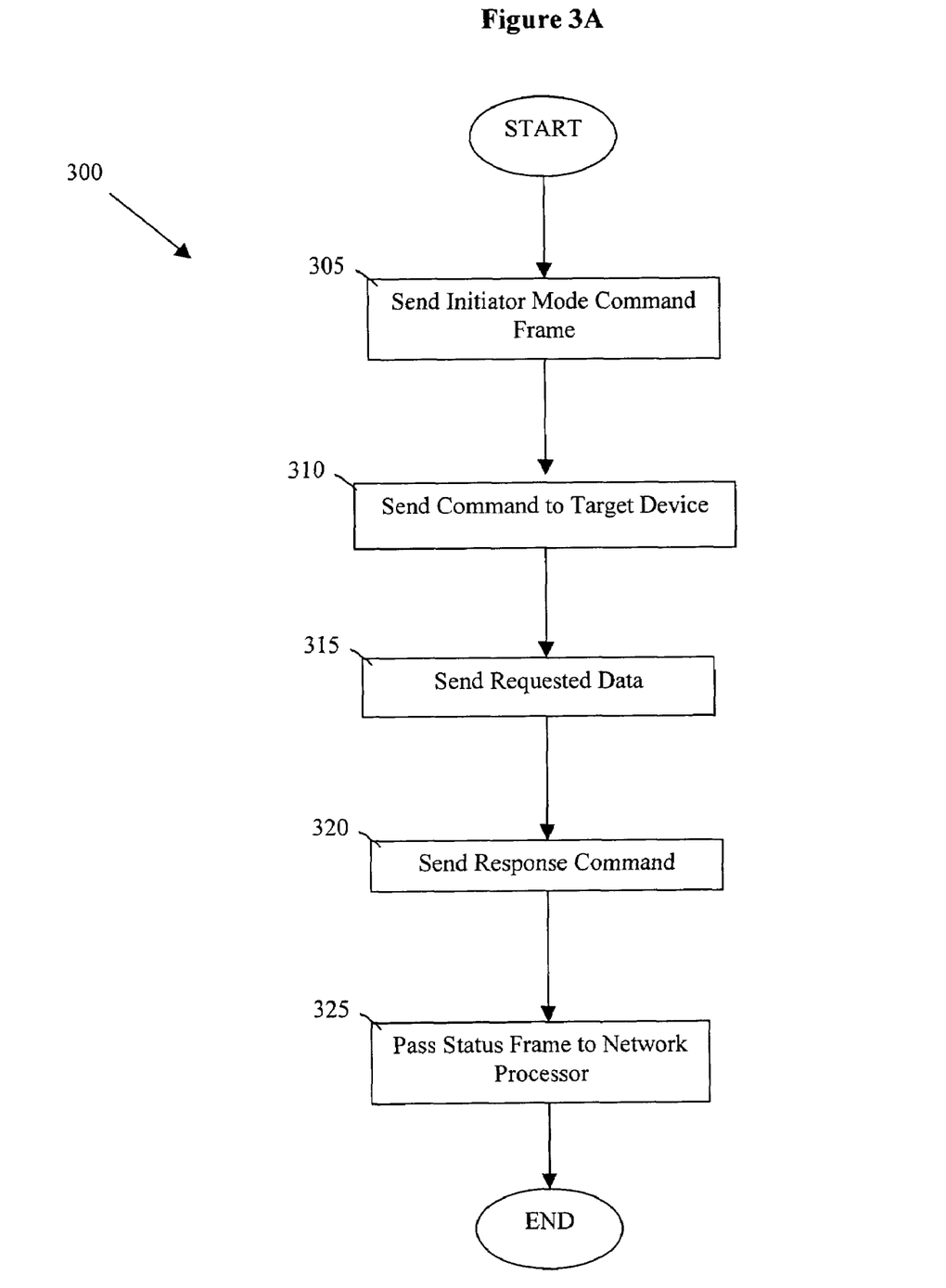

FIG. 3A illustrates one embodiment of the flow of data between the ASIC 10 and the network processor 16 for a Read operation performed in Initiator Mode. Process 300 begins when a Command Frame is sent from the network processor 16 to ASIC 10 (block 305). In one embodiment, the Command frame may include an identification handle for the network processor 16. In response to receiving the Command Frame, ASIC 10 may then send a command (e.g., FCP_CMND) to the appropriate FC target device requesting one or more data frames (block 310). While the FC target device may be any FC networking device, some examples include an FC disk, the front end of a RAID box and the front end of a storage virtualization system.

After the selected FC target device receives the command from ASIC 10, at block 315 of process 300 the target device may respond by providing the one or more requested data frames to the network processor 16. In one embodiment, these data frames may include the network processor 16 handle previously provided with the Command Frame. Thereafter, at block 320 the FC target device may send an FCP Response command (FCP_RSP) to the ASIC 10, which is then passed to the network processor 16 as part of a Status Frame (block 325). In one embodiment, this Status frame may include the previously provided network processor 16 handle.

Figure 3B:
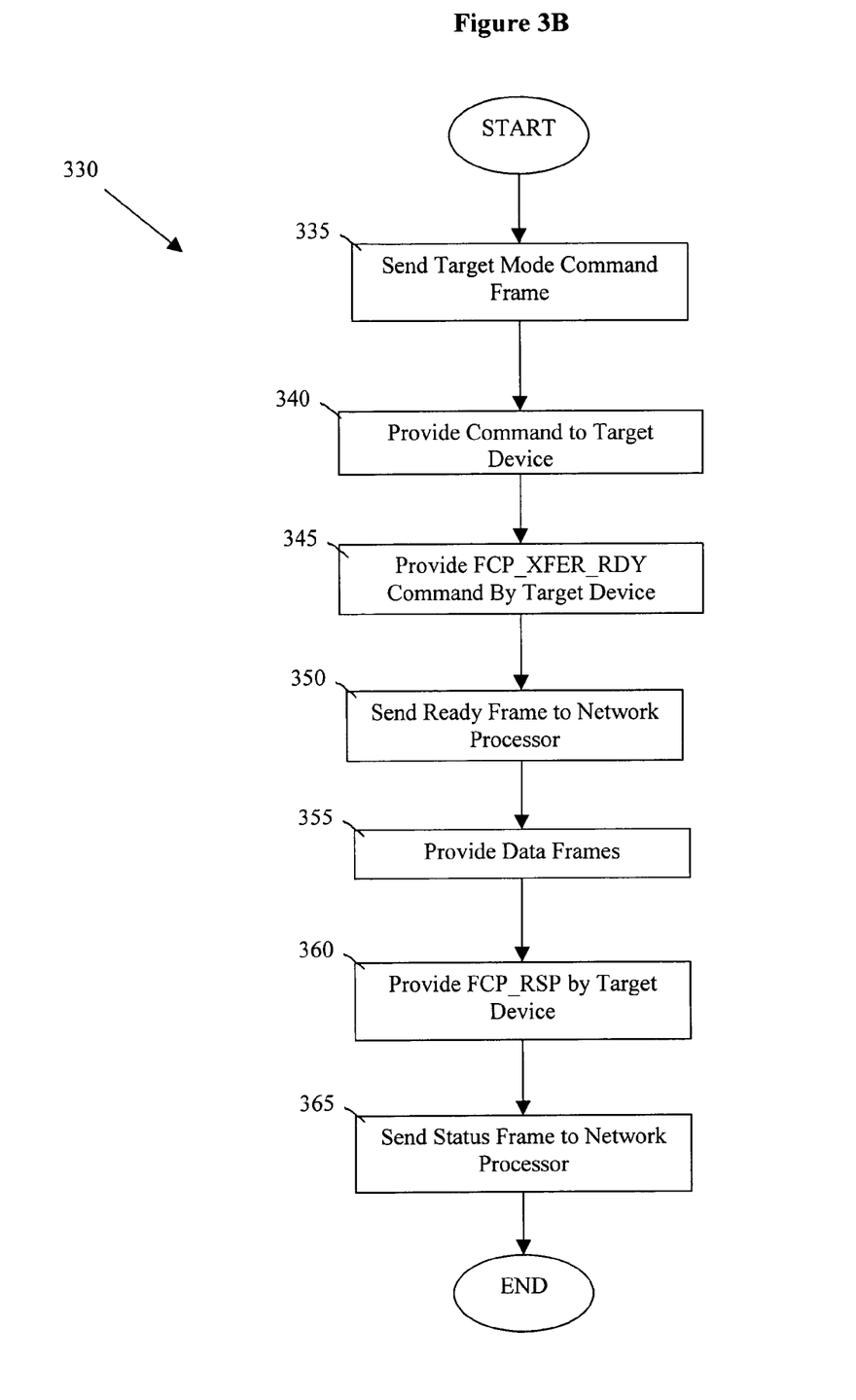

Referring now to FIG. 3B, one embodiment of the data flow between the ASIC 10 and the network processor 16 for a Write operation performed in Initiator Mode is depicted. Specifically, process 330 begins when a Command Frame is sent from the network processor 16 to ASIC 10 (block 335). In one embodiment, the Command frame may include an identification handle for the network processor 16. In response to receiving the Command Frame, ASIC 10 may then send a command (e.g., FCP_CMND) to the appropriate FC target device (block 340). While the FC target device may be any FC networking device, some examples include an FC disk, the front end of a RAID box and the front end of a storage virtualization system.

After the selected FC target device receives the command from ASIC 10, at block 345 of process 330 the target device may respond by providing a transfer ready command (e.g., FCP_XFER_RDY) to ASIC 10, which may then be forwarded to the network processor 16 in the form of a Ready Frame with a payload containing the transfer command (block 350). In one embodiment, the Ready Frame contains the handle for the network processor 16 previously provided, as well as a handle for ASIC 10 identifying the particular I/O context.

At this point, the network processor 16 may respond with one or more data frames in response to the FCP_XFER_RDY command (block 355). In one embodiment, these data frames may contain the ASIC 10 handle. In another embodiment, there may be a sequence of FCP_XFER_RDY commands followed by one or more data frames being transmitted. Once all requested data frames have been delivered, the FCP target device may send a response command (e.g., FCP_RSP) (block 360), which is then passed on to the network processor 16 as a Status Frame (block 365). The Status Frame may contain the previously provided network processor 16 handle.

Finally, as mentioned above, Initiator Mode commands may also be sent from the network processor 16 without including any additional data frames.

C. Raw Frame Mode

As mentioned above, another frame flow format for ASIC 10 is the Raw Frame Mode, which consists of transmitting raw FC frames (FC Frame header, any optional headers, and data payload) encapsulated within a POS frame. These POS frames may be sent from the network processor 16 to the ASIC 10 to be forwarded onto the FC channel 14. Similarly, such POS frames may also be sent from the ASIC 10 to the network processor as a result of receiving data on the FC channel 14 that is not associated with an active Target Mode or Initiator Mode I/O.

In one embodiment, one aspect of Raw Frame Mode is to send raw frames from the network processor 16 to ASIC 10. Upon successful sending of the one or more raw frames, ASIC 10 may provide an acknowledgement frame to the network processor 16 containing the network processor's handle previously provided as part of the sent raw frame(s).

Similarly, ASIC 10 may also send raw frame to the network processor 16 as part of the Raw Frame Mode. In this case, however, the raw frame may contain either solicited data (in response to a raw frame from the network processor 16 to the ASIC 10) or unsolicited data. That being said, in one embodiment, anytime the ASIC 10 receives an FC frame that does not belong to an active I/O context, internally generated I/O context, ASIC 10 may forward the frame to the network processor 16 as a raw frame.

D. Control Mode

Control Mode frames are the mechanism the network uses for communicating control information to the ASIC 10, according to one embodiment. In another embodiment, the hardware uses a specified field of the header to recognize Control Mode frames and route them to a different hardware queue than all other incoming frames. In one embodiment, this allows the hardware to give higher priority to incoming frames that belong to an I/O context, while Control Mode frames may be given a lower priority.

In one embodiment, the network processor initiates a Control Mode flow by sending a Control Mode Frame. This frame may contain both a handle and a specific frame field which identifies the control operation to be performed by the hardware. After successfully completing the control operation, the hardware sends to the network processor 16 an indication of the status of the completed control operation. In one embodiment, this indication of status may also include the handle from the Control Mode Frame.

The possible types of control operations include, but are not limited to, configure port, add handle, rescan devices, device report, remove device, abort, and purge I/O.

E. Event Reporting Mode

In one embodiment, Event Reporting Mode frames are used to communicate asynchronous events to the network processor 16. Contained in such frames may be an EventHandle and a Subtype field identifying the type of event report. Upon receiving an Event Reporting Mode frame, the network processor 16 may respond with an acknowledgement frame.

The possible types of event reports include, but are not limited to, new device, removed device, dropped frame, CRC error, abort, and command purge.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus coupled to a first network interface, comprising:
    a first network interface coupled to a network device on a first network in accordance with a first protocol;
    a second network interface to be coupled to a network processor on a second network having a second protocol; and,
    a processor coupled to the first network interface and the second network interface, said processor to translate said first protocol to said second protocol,
    wherein said apparatus receives network transfers on behalf of the network processor while operating in a first mode, and initiates network transfers on behalf of the network processor while operating in a second mode, wherein said first mode is a target mode and second mode is a initiator mode, and
    wherein said apparatus further determines which of said first mode operation and second mode operation to perform based on one or more frame header fields that includes a protocol field that is used to determine a frame type for frames received by said apparatus.

2. The apparatus of claim 1, wherein the apparatus is a protocol bridge, the first protocol is Fibre Channel and said network device is a Fibre Channel device.

3. The apparatus of claim 2, wherein the second protocol is Small Computer System Interface (SCSI) and the second network is a packet-over-SONET (POS) network.

4. The apparatus of claim 1, wherein said network processor is a storage processor and the second network is a POS network.

5. The apparatus of claim 1, wherein said apparatus to perform at least one of a target mode read operation and a target mode write operation while in said target mode.

6. The apparatus of claim 5, wherein said apparatus performs the target mode read operation by,
    providing a command frame to the network processor over the second network interface in accordance with the second protocol,
    receiving a data frame from the network processor that is sent in response to said command frame, and
    transmitting, over the first network interface, a payload of the data frame to the network device in accordance with the first protocol.

7. The apparatus of claim 6, wherein said apparatus performs said target mode operation by further,
    receiving a status frame from the network processor that includes a response command,
    transmitting said response command to the network device in accordance with the first protocol, and
    transmitting an acknowledgement frame to the network processor in accordance with the second protocol indicating that the target read operation is complete.

8. The apparatus of claim 5, wherein said apparatus performs the target mode write operation by,
providing a command frame to the network processor over the second network interface in accordance with the second protocol,
receiving a ready frame from the network processor that is sent in response to said command frame, said ready frame to contain a transfer command and to indicate that said network processor is ready to receive data, and
transmitting, over the first network interface, the transfer command to the network device in accordance with the first protocol.

9. The apparatus of claim 8, wherein said apparatus performs the target mode write operation by further,
receiving, from the network device in accordance with the first protocol, a data frame sent in response to said transfer command,
terminating the first protocol of the data frame, and
transmitting the data frame to the network processor in accordance with the second protocol.

10. The apparatus of claim 9, wherein said apparatus performs the target mode write operation by further
receiving a status frame from the network processor that includes a response command,
transmitting said response command to the network device in accordance with the first protocol, and
transmitting an acknowledgement frame to the network processor in accordance with the second protocol indicating that the target write operation is complete.

11. The apparatus of claim 1, wherein said apparatus to perform at least one of an initiator mode read operation and an initiator mode write operation while in said initiator mode.

12. The apparatus of claim 11, wherein said apparatus performs the initiator mode read operation by,
receiving a command frame from the network processor over the second network interface in accordance with the second protocol, said command frame to contain a data request command,
transmitting the data request command to the network device in accordance with the first protocol,
receiving, from the network device over the first network interface, a data frame in accordance with the first protocol, and
terminating said first protocol for said data frame.

13. The apparatus of claim 12, wherein said apparatus performs said initiator mode read operation by further,
transmitting said data frame to the network processor in accordance with the second protocol,
receiving a response command from the network device in accordance with the first protocol, and
transmitting a status frame containing the response command to the network processor in accordance with the second protocol.

14. The apparatus of claim 11, wherein said apparatus performs the initiator mode write operation by,
receiving a command frame containing a transfer command from the network processor over the second network interface in accordance with the second protocol,
transmitting the transfer command to the network device in accordance with the first protocol,
receiving a transfer ready command from the network device that is sent in response to said command, said transfer ready command to indicate that said network device is ready to receive data, and
transmitting, over the second network interface, a ready frame to the network processor in accordance with the second protocol, said ready frame to contain the transfer ready command.

15. The apparatus of claim 14, wherein said apparatus performs the target mode write operation by further,
receiving, from the network processor in accordance with the second protocol, a data frame sent in response to said transfer ready command,
transmitting the data frame to the network device in accordance with the first protocol,
receiving a response command from the network device according to the first protocol, and
providing a status frame to the network processor containing the response command, said status frame to indicate that the initiator write operation is complete.

16. The apparatus of claim 1, wherein said frame type is one of a target mode frame, initiator mode frame, raw frame, control mode frame and event reporting frame.

17. The apparatus of claim 16, upon receiving a raw frame, enters a raw frame mode in which frames received over said first network interface according to said first protocol are encapsulated into a second protocol frame and sent to said network processor over the second network interface.

18. The apparatus of claim 16, upon receiving a control mode frame, routes the control mode frame to a predetermined hardware queue that is different than a memory queue used for data frames, wherein said control mode frame to cause the apparatus to perform a control operation.

19. The apparatus of claim 16, to communicate an asynchronous event to said network processor, provides an event reporting frame to said network processor over the second network interface.

20. An apparatus, comprising:
a first network interface to be coupled to a network device on a first network in accordance with a first protocol that is terminated by said apparatus;
a second network interface to be coupled to a network processor on a second network having a second protocol; and,
a processor coupled to the first network interface and the second network interface,
wherein said apparatus functions as a target for the network processor while performing a target mode operation, and functions as an initiator on behalf of the network processor while performing an initiator mode operation,
wherein said target mode operation is one of a target mode read operation and a target mode write operation,
wherein said apparatus performs the target mode read operation by,
providing a command frame to the network processor over the second network interface in accordance with the second protocol,
receiving a data frame from the network processor that is sent in response to said command frame, and
transmitting, over the first network interface, a payload of the data frame to the network device in accordance with the first protocol.

21. The apparatus of claim 20, wherein said apparatus performs said target mode operation by further,
receiving a status frame from the network processor that includes a response command,
transmitting said response command to the network device in accordance with the first protocol, and transmitting an acknowledgement frame to the network processor in accordance with the second protocol indicating that the target read operation is complete.

22. The apparatus of claim 20, wherein said apparatus performs the target mode write operation by,
providing a command frame to the network processor over the second network interface in accordance with the second protocol
receiving a ready frame from the network processor that is sent in response to said command frame, said ready frame to contain a transfer command and to indicate that said network processor is ready to receive data, and
transmitting, over the first network interface, the transfer command to the network device in accordance with the first protocol.

23. The apparatus of claim 22, wherein said apparatus performs the target mode write operation by further,
receiving, from the network device in accordance with the first protocol, a data frame sent in response to said transfer command,
terminating the first protocol of the data frame, and
transmitting the data frame to the network processor in accordance with the second protocol.

24. The apparatus of claim 23, wherein said apparatus performs the target mode write operation by further
receiving a status frame from the network processor that includes a response command,
transmitting said response command to the network device in accordance with the first protocol, and
transmitting an acknowledgement frame to the network processor in accordance with the second protocol indicating that the target write operation is complete.

25. The apparatus of claim 20, wherein said initiator mode operation is one of an initiator mode read operation and an initiator mode write operation.

26. The apparatus of claim 25, wherein said apparatus performs the initiator mode read operation by,
receiving a command frame from the network processor over the second network interface in accordance with the second protocol, said command frame to contain a data request command,
transmitting the data request command to the network device in accordance with the first protocol,
receiving, from the network device over the first network interface, a data frame in accordance with the first protocol, and
terminating said first protocol for said data frame.

27. The apparatus of claim 26, wherein said apparatus performs said initiator mode read operation by further,
transmitting said data frame to the network processor in accordance with the second protocol,
receiving a response command from the network device in accordance with the first protocol, and
transmitting a status frame containing the response command to the network processor in accordance with the second protocol.

28. The apparatus of claim 25, wherein said apparatus performs the initiator mode write operation by,
receiving a command frame containing a transfer command from the network processor over the second network interface in accordance with the second protocol,
transmitting the transfer command to the network device in accordance with the first protocol,
receiving a transfer ready command from the network device that is sent in response to said command, said transfer ready command to indicate that said network device is ready to receive data, and
transmitting, over the second network interface, a ready frame to the network processor in accordance with the second protocol, said ready frame to contain the transfer ready command.

29. The apparatus of claim 28, wherein said apparatus performs the target mode write operation by further,
receiving, from the network processor in accordance with the second protocol, a data frame sent in response to said transfer ready command,
transmitting the data frame to the network device in accordance with the first protocol,
receiving a response command from the network device according to the first protocol, and
providing a status frame to the network processor containing the response command, said status frame to indicate that the initiator write operation is complete.

30. An apparatus coupled to a first network interface, comprising:
a first network interface coupled to a network device on a first network in accordance with a first protocol;
a second network interface to be coupled to a network processor on a second network having a second protocol; and,
a processor coupled to the first network interface and the second network interface, said processor to translate said first protocol to said second protocol,
wherein said apparatus receives network transfers on behalf of the network processor while operating in a first mode, and initiates network transfers on behalf of the network processor while operating in a second mode,
wherein said first mode is a target mode, said apparatus to perform at least one of a target mode read operation and a target mode write operation while in said target mode,
wherein said apparatus performs the target mode read operation by,
providing a command frame to the network processor over the second network interface in accordance with the second protocol,
receiving a data frame from the network processor that is sent in response to said command frame, and
transmitting, over the first network interface, a payload of the data frame to the network device in accordance with the first protocol.

31. An apparatus coupled to a first network interface, comprising:
a first network interface coupled to a network device on a first network in accordance with a first protocol;
a second network interface to be coupled to a network processor on a second network having a second protocol; and,
a processor coupled to the first network interface and the second network interface, said processor to translate said first protocol to said second protocol,
wherein said apparatus receives network transfers on behalf of the network processor while operating in a first mode, and initiates network transfers on behalf of the network processor while operating in a second mode,
wherein said second mode is an initiator mode, said apparatus to perform at least one of an initiator mode read operation and an initiator mode write operation while in said initiator mode,
wherein said apparatus performs the initiator mode read operation by, receiving a command frame from the network processor over the second network interface in accordance with the second protocol, said command frame to contain a data request command, transmitting the data request command to the network device in accordance with the first protocol, receiving, from the network device over the first network interface, a data frame in accordance with the first protocol, and terminating said first protocol for said data frame.

32. An apparatus, comprising:

a first network interface to be coupled to a network device on a first network in accordance with a first protocol that is terminated by said apparatus;

a second network interface to be coupled to a network processor on a second network having a second protocol; and, a processor coupled to the first network interface and the second network interface, wherein said apparatus functions as a target for the network processor while performing a target mode operation, and functions as an initiator on behalf of the network processor while performing an initiator mode operation, wherein said initiator mode operation is one of an initiator mode read operation and an initiator mode write operation, wherein said apparatus performs the initiator mode read operation by, receiving a command frame from the network processor over the second network interface in accordance with the second protocol, said command frame to contain a data request command, transmitting the data request command to the network device in accordance with the first protocol, receiving, from the network device over the first network interface, a data frame in accordance with the first protocol, and terminating said first protocol for said data frame.

* * * * *